United States Patent
Jin et al.

(10) Patent No.: US 10,516,745 B2
(45) Date of Patent: Dec. 24, 2019

(54) INFORMATION PROCESSING METHOD AND SERVICE PLATFORM

(71) Applicant: Huawei Technologies Co., Ltd., Shenzhen, Guangdong (CN)

(72) Inventors: Hongbo Jin, Shenzhen (CN); Zhuolin Jiang, Shenzhen (CN); Dong Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 552 days.

(21) Appl. No.: 15/195,949

(22) Filed: Jun. 28, 2016

(65) Prior Publication Data
US 2016/0308983 A1    Oct. 20, 2016

Related U.S. Application Data

(63) Continuation of application No. PCT/CN2014/080753, filed on Jun. 25, 2014.

(30) Foreign Application Priority Data

Dec. 31, 2013 (CN) .......................... 2013 1 0752380

(51) Int. Cl.
*H04L 29/08* (2006.01)
*H04L 29/06* (2006.01)
*H04N 21/258* (2011.01)

(52) U.S. Cl.
CPC .............. *H04L 67/16* (2013.01); *H04L 67/26* (2013.01); *H04L 67/306* (2013.01); *H04L 67/42* (2013.01); *H04N 21/25883* (2013.01)

(58) Field of Classification Search
CPC ....... H04L 67/16; H04L 67/26; H04L 67/306; H04L 67/42; H04L 67/10; H04N 21/25883; H04N 21/4268
(Continued)

(56) References Cited

U.S. PATENT DOCUMENTS

| 8,472,611 B2 | 6/2013 | Chishti | |
| 2006/0212900 A1* | 9/2006 | Ismail | H04H 60/06 |
| | | | 725/34 |
| 2007/0179863 A1 | 8/2007 | Stoll | |
| 2007/0282610 A1* | 12/2007 | Luss | G06F 21/31 |
| | | | 704/273 |

(Continued)

FOREIGN PATENT DOCUMENTS

| CN | 101155260 A | 4/2008 |
| CN | 102713908 A | 10/2012 |
| CN | 103246672 A | 8/2013 |

OTHER PUBLICATIONS

Aly M, Hatch A, Josifovski V, Narayanan VK. Web-scale user modeling for targeting. InProceedings of the 21st international conference on world wide web Apr. 16, 2012 (pp. 3-12). ACM. (Year: 2012).*

(Continued)

*Primary Examiner* — James N Fiorillo
(74) *Attorney, Agent, or Firm* — Staas & Halsey LLP

(57) ABSTRACT

The present invention relates to the field of communications technologies, and discloses an information processing method and a service platform, so as to resolve a problem that information in which a current user is interested cannot be pushed to user equipment, and further user experience is lowered. The method provided by the present invention may specifically include: receiving, by a service platform, feature information of a current user sent by an application, where the current user is a user that is currently using the application; processing the feature information by using a demography model, to obtain personal information of the current user; and sending the personal information to the application, so that the application outputs corresponding content for the current user according to the personal information. The method and the service platform may be applied to information processing.

11 Claims, 3 Drawing Sheets

(58) Field of Classification Search
USPC .............................. 709/203; 706/12; 705/41
See application file for complete search history.

(56) References Cited

U.S. PATENT DOCUMENTS

| | | | |
|---|---|---|---|
| 2009/0185040 A1 | 7/2009 | Yang et al. | |
| 2009/0216800 A1* | 8/2009 | Neil | G06F 16/90328 |
| 2010/0299388 A1* | 11/2010 | Bolnick | G06Q 30/02 |
| | | | 709/203 |
| 2011/0125783 A1 | 5/2011 | Whale et al. | |
| 2013/0007120 A1* | 1/2013 | Teifke | G06F 16/273 |
| | | | 709/203 |
| 2013/0205327 A1* | 8/2013 | Eyer | G06Q 30/02 |
| | | | 725/24 |
| 2013/0274007 A1* | 10/2013 | Hilbert | A63F 13/00 |
| | | | 463/29 |
| 2013/0290234 A1* | 10/2013 | Harris | G06N 5/022 |
| | | | 706/46 |
| 2014/0095413 A1* | 4/2014 | Kirillov | H04N 21/25883 |
| | | | 706/12 |
| 2014/0101685 A1* | 4/2014 | Kitts | H04N 21/44213 |
| | | | 725/14 |
| 2015/0012426 A1* | 1/2015 | Purves | G06Q 30/0623 |
| | | | 705/41 |
| 2015/0033330 A1* | 1/2015 | Counterman | G06F 21/6245 |
| | | | 726/20 |
| 2015/0127565 A1* | 5/2015 | Chevalier | G06Q 10/00 |
| | | | 705/319 |
| 2015/0169624 A1* | 6/2015 | Gupta | G06F 16/951 |
| | | | 707/639 |
| 2017/0228711 A1* | 8/2017 | Chawla | G06Q 20/12 |

OTHER PUBLICATIONS

Jian Hu et al., "Demographic Prediction Based on User's Browsing Behavior", WWW 2007/Track: Data Mining, May 8-12, 2007, pp. 151-160.

* cited by examiner

INFORMATION PROCESSING METHOD AND SERVICE PLATFORM

CROSS-REFERENCE TO RELATED APPLICATIONS

This application is a continuation of International Application No. PCT/CN2014/080753, filed on Jun. 25, 2014, which claims priority to Chinese Patent Application No. 201310752380.X, filed on Dec. 31, 2013, both of which are hereby incorporated by reference in their entireties.

TECHNICAL FIELD

The present invention relates to the field of information technologies, and in particular, to an information processing method and a service platform.

BACKGROUND

In the prior art, there is often a case in which multiple persons use same user equipment or use a same registered account to access the Internet, where the user equipment may be a computer, a mobile phone, a tablet computer, or the like. An application server determines, according to an operation habit of a user who has used the user equipment or a user who has logged in to the registered account, a preference of the user, and pushes corresponding information such as video information, picture information, or web page link information to the user equipment or to the registered account according to the preference.

For example, a user 1 and a user 2 are nonregistered users, and use same user equipment to access the Internet, or, a user 1 and a user 2 use a same registered account to access the Internet. After the user 1 and the user 2 use the same user equipment or use the same registered account to access the Internet, the application server determines preferences of the user 1 and the user 2 according to operation habits of the user 1 and the user 2, and then determines, according to the preferences of the user 1 and the user 2, push information in which the user 1 and the user 2 are interested, and pushes the push information to the user equipment or the registered account. Specifically, if the user 1 and the user 2 are nonregistered users, the application server determines the push information by using the user equipment as a unit; or, the application server determines the push information by using the registered account as a unit. It can be known that, the push information determined and pushed by the application server not only includes information in which the user 1 is interested, but also includes push information in which the user 2 is interested.

In a process of implementing the foregoing information processing, the inventor finds that the prior art has at least the following problems: after the application server pushes the information in which the user 1 and the user 2 are interested to the user equipment or the registered account, when the user 1 or the user 2 uses the user equipment or the registered account to access the Internet, the user 1 or the user 2 not only receives push information that is suitable for the user 1 or the user 2 and in which the user 1 or the user 2 is interested, but also receives push information of another person. In other words, the user 1 receives push information that is not suitable for the user 1 and in which the user 1 is not interested; therefore, user experience is lowered. For example, when the user 1 is an adult and the user 2 is a minor, if information not suitable for the user 2 to browse, such as information involving violence, exists in information in which the user 1 is interested, negative impact is brought to the user 2.

SUMMARY

The present invention provides an information processing method and a service platform, so as to resolve a problem that a user receives push information that is not suitable for the user and in which the user is not interested. This lowers user experience.

To achieve the foregoing objective, the following technical solutions are used in the present invention:

According to a first aspect, an information processing method is provided, including:

receiving, by a service platform, feature information of a current user sent by an application, where the current user is a user that is currently using the application;

processing the feature information by using a demography model, to obtain personal information of the current user; and sending the personal information to the application, so that the application outputs corresponding content for the current user according to the personal information.

With reference to the first aspect, in a first implementation manner of the first aspect, the service platform includes: a service platform server and a service platform client, and the demography model is stored on the service platform server;

before the receiving, by a service platform, feature information of a current user sent by an application, the method further includes:

establishing, on the service platform server, an application programming interface (API) corresponding to a submodel of the demography model, where the demography model includes the at least one submodel;

before the processing the feature information by using a demography model, the method further includes:

receiving an API call request sent by the application, where the API call request is used to indicate a to-be-called API; and the processing the feature information by using a demography model, to obtain personal information of the current user includes:

searching, on the service platform server, the demography model for a submodel corresponding to the to-be-called API;

acquiring, on the service platform server, processing code from the found submodel; and processing the feature information according to the processing code, to obtain the personal information corresponding to the feature information.

With reference to the first implementation manner of the first aspect, in a second implementation manner of the first aspect, the establishing an application programming interface (API) corresponding to a submodel of the demography model includes:

establishing at least one type of the following APIs: a gender model API corresponding to a gender model, an age model API corresponding to an age model, or an occupation model API corresponding to an occupation model, where the to-be-called API includes the at least one type of API in the established API.

With reference to the first implementation manner of the first aspect or the second implementation manner of the first aspect, in a third implementation manner of the first aspect, the receiving, by a service platform, feature information of a current user sent by an application includes:

receiving, on the service platform client, the feature information sent by the application; and the processing the feature information according to the processing code, to obtain the personal information corresponding to the feature information includes:

sending, on the service platform server, the processing code to the service platform client; and processing, on the service platform client, the feature information according to the processing code, to obtain the personal information corresponding to the feature information.

With reference to the first implementation manner of the first aspect or the second implementation manner of the first aspect, in a fourth implementation manner of the first aspect, the receiving, by a service platform, feature information of a current user sent by an application includes:

receiving, on the service platform server, the feature information sent by the application; or receiving, on the service platform client, the feature information sent by the application, and sending the feature information to the service platform server; and the processing the feature information according to the processing code, to obtain the personal information corresponding to the feature information includes:

processing, on the service platform server, the feature information according to the processing code, to obtain the personal information corresponding to the feature information.

With reference to any manner of the first implementation manner of the first aspect to the fourth implementation manner of the first aspect, in a fifth implementation manner of the first aspect, the method further includes:

acquiring, on the service platform client, multiple types of different feature information of multiple users, and sending the multiple types of different feature information to the service platform server; and performing, on the service platform server, model training on the demography model according to the multiple types of different feature information.

With reference to the first aspect or any manner of the first implementation manner of the first aspect to the fifth implementation manner of the first aspect, in a sixth implementation manner of the first aspect, the receiving, by a service platform, feature information of a current user sent by an application includes:

receiving, by the service platform, at least one type of the following information sent by the application: audio information, image information, sensing parameter information, and application operation information.

According to a second aspect, a service platform is provided, including:

the service platform, configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information.

With reference to the second aspect, in a first implementation manner of the second aspect, the service platform includes: a service platform server and a service platform client, and the demography model is stored on the service platform server;

the service platform server includes:

an establishing unit, configured to: before the service platform receives the feature information of the current user sent by the application, establish an application programming interface (API) corresponding to a submodel of the demography model, where the demography model includes the at least one submodel;

the service platform is further configured to: before processing the feature information by using the demography model, receive an API call request sent by the application, where the API call request is used to indicate a to-be-called API;

the service platform server further includes:

a searching unit, configured to search the demography model for a submodel corresponding to the to-be-called API; and a first acquiring unit, configured to acquire, on the service platform server, processing code from the submodel found by the searching unit; and the service platform is further configured to process the feature information according to the processing code acquired by the first acquiring unit, to obtain the personal information corresponding to the feature information.

With reference to the first implementation manner of the second aspect, in a second implementation manner of the second aspect, the establishing unit is specifically configured to establish at least one type of the following APIs: a gender model API corresponding to a gender model, an age model API corresponding to an age model, or an occupation model API corresponding to an occupation model, where the to-be-called API includes the at least one type of API in the established API.

With reference to the first implementation manner of the second aspect or the second implementation manner of the second aspect, in a third implementation manner of the second aspect, the service platform client includes:

a first receiving unit, configured to receive the feature information sent by the application;

the service platform server further includes:

a first sending unit, configured to send the processing code acquired by the first acquiring unit to the service platform client; and the service platform client further includes:

a first processing unit, configured to process the feature information according to the processing code sent by the first sending unit, to obtain the personal information corresponding to the feature information.

With reference to the first implementation manner of the second aspect or the second implementation manner of the second aspect, in a fourth implementation manner of the second aspect, the service platform server further includes:

a second receiving unit, configured to receive the feature information sent by the application;

the service platform client further includes:

a first receiving unit, configured to receive the feature information sent by the application; and a second sending unit, configured to send the feature information received by the first receiving unit to the service platform server; and the service platform server further includes:

a second processing unit, configured to process the feature information according to the processing code acquired by the first acquiring unit, to obtain the personal information corresponding to the feature information.

With reference to any manner of the first implementation manner of the second aspect to the fourth implementation manner of the second aspect, in a fifth implementation manner of the second aspect, the service platform client further includes:

a second acquiring unit, configured to acquire multiple types of different feature information of multiple users, where the second sending unit is further configured to send the multiple types of different feature information that are acquired by the second acquiring unit to the service platform server; and the service platform server further includes:

a training unit, configured to perform model training on the demography model according to the multiple types of different feature information that are acquired by the second acquiring unit.

With reference to the second aspect or any manner of the first implementation manner of the second aspect to the fifth implementation manner of the second aspect, in a sixth implementation manner of the second aspect, the service platform is specifically configured to receive at least one type of the following information sent by the application: audio information, image information, sensing parameter information, and application operation information.

According to the information processing method and the service platform that are provided by the present invention, a service platform receives feature information of a current user sent by an application, where the current user is a user that is currently using the application; processes the feature information by using a demography model, to obtain personal information of the current user; and sends the personal information to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
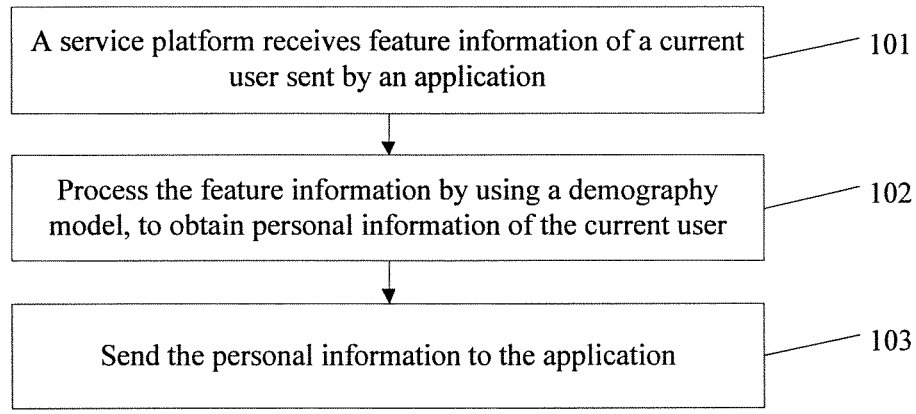
FIG. 1 is a flowchart of an information processing method according to an embodiment.

An embodiment provides an information processing method. As shown in FIG. 1, the method may include:

101: A service platform receives feature information of a current user sent by an application.

The current user is a user that is currently using the application.

If an application needs to output corresponding content according to personal information of the current user, the content output by the application should be content that is suitable for the current user and in which the current user is interested, and further a requirement of the current user can be better satisfied. Specifically, the application may first acquire the feature information of the current user, and send the feature information to the service platform; and the service platform can acquire the personal information corresponding to the feature information.

102: Process the feature information by using a demography model, to obtain personal information of the current user.

The demography model may include, but is not limited to, processing code used to acquire the personal information corresponding to the feature information, or the like.

In an implementation manner of this embodiment, after receiving the feature information, the service platform may acquire processing code corresponding to the feature information from the demography model, and acquire, according to the acquired processing code, the personal information corresponding to the feature information, where the acquired personal information is the personal information of the current user.

103: Send the personal information to the application, so that the application outputs corresponding content for the current user according to the personal information.

The service platform may send the acquired personal information to the application; and then the application may output the corresponding content according to the received personal information, where the corresponding content may be content that is suitable for the current user and in which the current user is interested. In this way, the requirement of the current user can be better satisfied, and further user experience is improved.

In this embodiment, a service platform receives feature information of a current user sent by an application, where the current user is a user that is currently using the application; processes the feature information by using a demography model, to obtain personal information of the current user; and sends the personal information to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

An embodiment provides another information processing method, where the method is a further extension and optimization of the method shown in FIG. 1. In this embodiment, the service platform may include: a service platform server and a service platform client.

Figure 2:
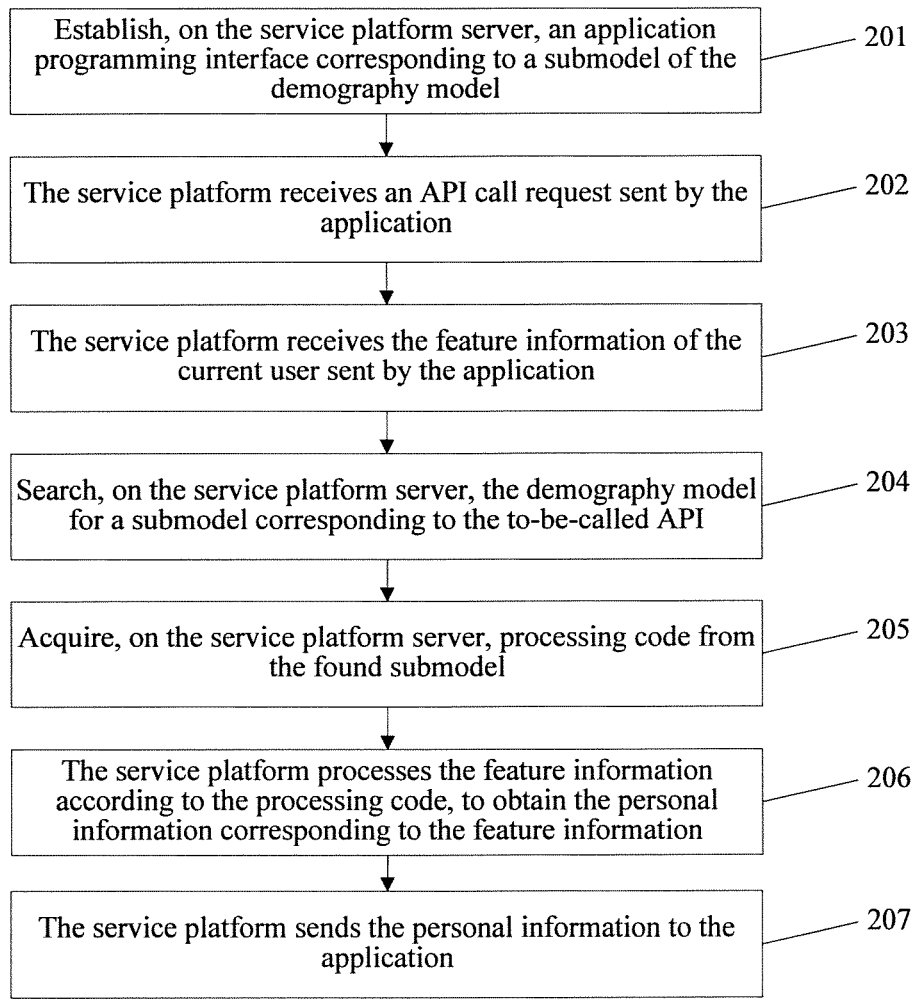
FIG. 2 is a flowchart of another information processing method according to an embodiment.

Specifically, as shown in FIG. 2, the information processing method provided by this embodiment may include, but is not limited to, the following steps:

201: Establish, on the service platform server, an application programming interface (English: Application Programming Interface, API for short) corresponding to a submodel of the demography model.

The demography model is stored on the service platform server.

Further, the establishing an application programming interface (API) corresponding to a submodel of the demography model includes:

establishing at least one type of the following APIs: a gender model API corresponding to a gender model, an age model API corresponding to an age model, or an occupation model API corresponding to an occupation model.

The gender model may include processing code of a method for acquiring gender information corresponding to the feature information; the age model may include processing code of a method for acquiring age information corresponding to the feature information; and the occupation model may include processing code of a method for acquiring occupation information corresponding to the feature information.

In other words, the demography model may include at least one of the following submodels: a gender model, an age model, and an occupation model, and each submodel corresponds to one API. When an application calls an API, it may be that the application calls processing code in a submodel corresponding to the API.

After completing establishing an API, the service platform server may open the established API to another application, for example, may set, but is not limited to setting, the established API in an SDK (Software Development Kit, software development kit) of user equipment and open the established API to another application, so that the another application can call a required API.

The user equipment provided by this embodiment may be user equipment on which the application is installed and running, that is, user equipment that is being used by the current user, and the user equipment may be, but is not limited to, a computer, or the like. The current user may be the user that is currently using the application.

A method for establishing an API and opening the API is not limited by this embodiment, is a technology well known by a person skilled in the art, and may be set according to an actual need. Details are not described herein again.

202: The service platform receives an API call request sent by the application.

When an application is run, the application may acquire personal information of a current user by invoking corresponding processing code in the demography model. Specifically, it may be that the application sends an API call request to the service platform, to call a corresponding API, and further acquire processing code corresponding to the called API.

The personal information may include, but is not limited to, at least one of the following information: gender information, age information, occupation information, and the like, and specifically included information may be determined by the API called by the application.

In an implementation manner of this embodiment, the receiving, by the service platform, an API call request sent by the application may include, but is not limited to, receiving, by the service platform client, the API call request sent by the application, and sending, by the service platform client, the API call request to the service platform server; or, receiving, by the service platform server, the API call request sent by the application.

The API call request is used to indicate a to-be-called API, where the to-be-called API may include, but is not limited to, at least one type of API in the API that is established in step 201. If the to-be-called API is the gender model API, that is, the application calls the gender model API, it indicates that the application needs to acquire gender information of the current user; if the to-be-called API is the age model API, that is, the application calls the age model API, it indicates that the application needs to acquire age information of the current user; and if the to-be-called API is the occupation model API, that is, the application calls the occupation model API, it indicates that the application needs to acquire occupation information of the current user.

203: The service platform receives the feature information of the current user sent by the application.

Further, the receiving, by the service platform, the feature information of the current user sent by the application may include, but is not limited to, receiving, by the service platform, at least one type of the following information sent by the application: audio information, image information, sensing parameter information, and application operation information. In other words, the feature information may include, but is not limited to, at least one type of the following information: the audio information, the image information, the sensing parameter information, and the application operation information.

In an implementation manner of this embodiment, if the feature information includes the image information, the image information may be information that includes image information of the current user and that the application instructs an image acquiring device disposed on the user equipment to acquire.

For example, the application may instruct a camera disposed on the user equipment to acquire an image, where the image may include, but is not limited to, a face image, an environment image, or the like of the current user.

Content included in the image information is not limited by this embodiment, and may be set according to an actual need. Details are not described herein again.

Further, if the feature information includes the audio information, the audio information may be information that includes the audio information of the current user and that the application instructs an audio acquiring device disposed on the user equipment to acquire.

For example, the application may instruct a microphone disposed on the user equipment to acquire current audio information, where the audio information may be used to represent a sound in an environment in which the user equipment is located, or may be used to represent a sound of the current user.

Content included in the audio information is not limited by this embodiment, and may be set according to an actual need. Details are not described herein again.

Further, if the feature information includes the sensing parameter information, the sensing parameter information may be information that the application instructs a sensor disposed on the user equipment to acquire.

For example, the application may instruct an acceleration sensor disposed on the user equipment to acquire a state of the user equipment, which, for example, may include: a motion state, a static state, a motion speed of the user equipment in the motion state, or the like.

Further, the application may further instruct the user equipment to acquire a locally installed application, and further may obtain information about the installed application, where the information about the installed application may be used to represent, but is not limited to being used to represent, a football game application, an image beautifying application, or the like.

A method for the application to acquire the feature information and content included in the feature information are not limited by this embodiment, and may be set according to an actual need. Details are not described herein.

204: Search, on the service platform server, the demography model for a submodel corresponding to the to-be-called API.

The demography model may include at least one submodel, where the at least one submodel may include processing code for acquiring the corresponding personal information, where the processing code may include, but is not limited, a correspondence between the feature information and the corresponding personal information.

Further, the service platform may further periodically perform model training on the demography model according to multiple types of different feature information.

Specifically, the following may be included: acquiring, on the service platform client, multiple types of different feature information of multiple users, and sending the multiple types of different feature information to the service platform server; and performing, on the service platform server, model training on the demography model according to the multiple types of different feature information.

A method for the service platform to perform model training on the demography model according to the multiple types of different feature information is not limited by this embodiment, is a technology well known by a person skilled in the art, and may be set according to an actual need. Details are not described herein again.

In an implementation manner of this embodiment, if the demography model includes: the gender model, the age model, and the occupation model, and the feature information includes the at least one of the following information: the audio information, the image information, the sensing parameter information, and the information about the installed application, processing code corresponding to the gender model, the age model, and the occupation model may all be used to represent, but is not limited to being used to represent, four different correspondences, that is, the processing code in the demography model may be used to represent, but is not limited to being used to represent, 12 correspondences separately.

Specifically, the foregoing 12 correspondences may include: in the gender model: a correspondence between the gender information and the audio information, a correspondence between the gender information and the image information, a correspondence between the gender information and the sensing parameter information, a correspondence between the gender information and the information about the installed application, a correspondence between the age information and the audio information; in the age model: a correspondence between the age information and the image information, a correspondence between the age information and the sensing parameter information, a correspondence between the age information and the information about the installed application, and a correspondence between the occupation information and the audio information; and in the occupation model: a correspondence between the occupation information and the image information, a correspondence between the occupation information and the sensing parameter information, and a correspondence between the occupation information and the information about the installed application.

In the demography model, the personal information and the feature information may be quantized, and the foregoing 12 correspondences may be indicated by using 12 function formulas, that is, the processing code included in the demography model may be used to represent the following 12 function formulas.

For example, the foregoing 12 correspondences may be indicated, but is not limited to being indicated, by using a function formula $y=f_n(x)$, where n may be equal to any integer of 1 to 12, that is, when n has different values, 12 function formulas can be obtained; x may be any information in the feature information, that is, may be the audio information, the image information, the sensing parameter information, or the information about the installed application; and y may be the gender information, the age information, or the occupation information.

For example, when n=1, that is, the function formula is $y=f_1(x)$, where in the function formula, x is the audio information in the feature information, and y is the gender information in the personal information; the function formula $y=f_1(x)$ may be used to represent the correspondence between the audio information and the gender information; and the user equipment may determine a gender y of the current user according to the acquired audio information x and $y=f_1(x)$, where the audio information x may include audio data generated when the current user speaks.

For another example, when n=2, that is, the function formula is $y=f_2(x)$, where in the function formula, x is the audio information in the feature information, and y is the age information in the personal information; the function formula $y=f_2(x)$ may be used to represent a correspondence between the audio information and the age information; and the user equipment may determine an age y of the current user according to the acquired audio information x and $y=f_2(x)$.

For still another example, when n=10, that is, the function formula is $y=f_{10}(x)$, where in the function formula, x is the image information in the feature information, and y is the gender information in the personal information; the function formula $y=f_{10}(x)$ may be used to represent the correspondence between the image information and the gender information; and the user equipment may determine a gender y of the current user according to the acquired image information x and $y=f_{10}(x)$, where the image information x may include face information of the current user.

The demography model is not limited to the examples listed above. The demography model, content included in the demography model, and $f_n(\cdot)$ are not limited by this embodiment, and are technologies well known by a person skilled in the art. Details are not described herein again.

In an implementation manner of this embodiment, if the to-be-called API is the gender model API, the submodel corresponding to the to-be-called API is the gender model; if the to-be-called API is the age model API, the submodel corresponding to the to-be-called API is the age model; and if the to-be-called API is the occupation model API, the submodel corresponding to the to-be-called API is the occupation model.

For example, if the application calls the age model API, processing code acquired by the service platform server from the age model may be used to represent the correspondence between the feature information and the age information, and personal information obtained after the feature information is processed according to the processing code may include, but is not limited to, the age information. Specifically, the processing code may be used to represent all function formulas in which y is the age information in the function formula $y=f_n(x)$, where all the function formulas in which y is the age information may include four function formulas, that is, four function formulas in which y is the age information and in which x is separately the audio information, the image information, the sensing parameter information, and the information about the installed application. A processing method for calling another API is similar to a processing method for calling the age model API. Details are not described herein again.

In other words, if the application calls the age model API, the processing code acquired by the service platform server from the age model may be used to represent the correspondence between the feature information and the age information; if the feature information includes: the audio information, the image information, the sensing parameter information, and the information about the installed application, the acquired processing code may be specifically used to represent: the correspondence between the audio information and the age information, the correspondence between the image information and the age information, the correspondence between the sensing parameter information and the age information, and the correspondence between the information about the installed application and the age information; in this way, four pieces of age information may be obtained after the service platform processes the feature information according to the processing code, and then, one piece of age information may be acquired from the four pieces of age information, as the age information in the personal information.

Further, the application may further call at least one API at the same time, that is, the acquired personal information may include at least one piece of information of the age information, the occupation information, and the gender information.

205: Acquire, on the service platform server, processing code from the found submodel.

For example, if the feature information includes the sensing parameter information, when the application calls the age model API, processing code acquired by the service platform from the age model may be used to represent a function formula in which x is the sensing parameter information and in which y is the age information; when the application calls the gender model API, processing code acquired by the service platform from the gender model may be used to represent a function formula in which x is the sensing parameter information and in which y is the gender information; and when the application calls the occupation model API, processing code acquired by the service plat-form from the occupation model may be used to represent a function formula in which x is the sensing parameter information and in which y is the occupation information.

For another example, if the feature information includes the sensing parameter information, and the application calls the age model API and the gender model API at the same time, processing code acquired by the service platform from the age model may be used to represent a function formula of the correspondence between the sensing parameter information and the age information; processing code acquired by the service platform from the gender model may be used to represent a function formula of the correspondence between the sensing parameter information and the gender information; and the service platform may separately calculate, according to the acquired two function formulas, the age information and the gender information that correspond to the sensing parameter information. The sensor may be, but is not limited to, an acceleration sensor, where the acceleration sensor may acquire a moving speed, a moving amplitude, or the like of the user equipment, for example, if the user equipment determines, according to the moving speed, that the current user walks, and if the moving speed is low, it may be determined that the current user is an old person over 60.

If the feature information further includes the information about the installed application, processing code acquired by the service platform from the demography model may be further used to represent two function formulas in which x is the information about the installed application and in which y is separately the age information and the gender information, where the two function formulas may be used to separately represent the correspondence between the information about the installed application and the age information and the correspondence between the information about the installed application and the gender information. The service platform may separately calculate, according to the two function formulas, the gender information and the age information that correspond to the information about the installed application. For example, if many football game applications are installed in the user equipment, it may be determined that a gender of the current user that uses the application may be male, and an age may be 20 to 30.

If two pieces of gender information obtained by using the four acquired function formulas are different, and/or the two obtained pieces of occupation information are different, the final personal information may be obtained in a manner of weighting and fusion. It can be known that, the demography model provided by this embodiment is a fusion model of multiple data sources. In other words, the demography model may be used to represent an intermediate result that is obtained after demography prediction is performed by using multiple types of different data sources, that is, multiple types of feature information, where the intermediate result may include multiple types of personal information with different results, and then the final personal information is obtained according to a weighted fusion algorithm.

For example, if in a process of acquiring the age information, a weight value of the sensing parameter information is 1, and a weight value of the information about the installed application is 0, it may be determined that the age information in the personal information is the age information that is acquired according to the sensing parameter information; and if in a process of acquiring the gender information, the weight value of the sensing parameter information is less than the weight value of the information about the installed application, it may be determined that the occupation information in the personal information is the occupation information that is acquired according to the information about the installed application.

In a process of obtaining the final personal information in the manner of weighting and fusion, the final personal information is not limited to being determined according to only the weight and may also be determined with reference to another parameter, but a weight value greatly affects a result thereof. In addition, a weight value of the feature information may be determined, but is not limited to being determined, in a process of training the demography model.

206: The service platform processes the feature information according to the processing code, to obtain the personal information corresponding to the feature information.

Further, the processing, by the service platform, the feature information according to the processing code, to obtain the personal information corresponding to the feature information may be performed on the service platform server, or may be performed on the service platform client.

If the processing, by the service platform, the feature information according to the processing code, to obtain the personal information corresponding to the feature information is performed on the service platform client, the feature information sent by the application may be received on the service platform client.

The processing, by the service platform, the feature information according to the processing code, to obtain the personal information corresponding to the feature information may include, but is not limited to, sending, on the service platform server, the processing code to the service platform client; and processing, on the service platform client, the feature information according to the processing code, to obtain the personal information corresponding to the feature information.

The service platform processes the feature information according to the processing code, to obtain the personal information corresponding to the feature information, so that it can be ensured that the feature information is not uploaded to the service platform server, thereby avoiding the feature information from being leaked, and enhancing security of the personal information of the current user.

If the processing, by the service platform, the feature information according to the processing code, to obtain the personal information corresponding to the feature information is performed on the service platform server, the feature information sent by the application may be received on the service platform server; or the feature information sent by the application may be received on the service platform client, and the feature information may be sent to the service platform server.

The processing, by the service platform, the feature information according to the processing code, to obtain the personal information corresponding to the feature information may include, but is not limited to, processing, on the service platform server, the feature information according to the processing code, to obtain the personal information corresponding to the feature information.

207: The service platform sends the personal information to the application, so that the application outputs corresponding content for the current user according to the personal information.

In an implementation manner of this embodiment, if the personal information is acquired by the service platform client, the service platform client sends the personal information to the application; if the personal information is acquired by the service platform server, the service platform server sends the personal information to the application.

After receiving the personal information, the application may output the corresponding content for the current user according to the personal information, where the output corresponding content may be content that is suitable for the current user and in which the current user is interested. Therefore, a more suitable service can be provided to the current user, and further user experience is improved.

In an implementation manner of this embodiment, the outputting, by the application, corresponding content for the current user according to the personal information may include, but is not limited to, that the application may acquire to-be-pushed information corresponding to the personal information from a push information set according to a push rule, and push the to-be-pushed information to the user equipment, that is, output the to-be-pushed information by using the user equipment.

The push rule may include a correspondence between the personal information and the to-be-pushed information, and the push information set may include at least one piece of push information, where the at least one piece of push information includes information that involves a preference of a preset user.

The preset user may include at least one user, and the application may determine push information of the preset user according to the preference of the preset user, to obtain the push information set, where the push information set may include the push information corresponding to the preset user.

The user may include, but is not limited to, all users that have used the application or the user equipment; or all users that have used the application if a current account that is logged in to is in a logged-in state.

Further, the preset user may include: the current user.

For example, if a user 1 and a user 2 uses a same registered account to access the Internet, that is, the preset user includes the user 1 and the user 2, the user 1 prefers to browse a military web page, and the user 2 prefers to browse a traveling web page, the application may set both information involving military and information involving traveling as push information of the registered account, to obtain a push information set of the registered account, that is, in this case, the push information set may include: the information involving military and the information involving traveling; when the user 1 logs in to the registered account again to access the Internet, the application may acquire feature information of the user 1, and then may acquire personal information of the user 1 by using the demography model in the service platform, and finally the application may acquire push information corresponding to the personal information of the user 1 from the push information set, and output the acquired push information by using the user equipment. In other words, the push information set includes push information in which the user 1 and the user 2 are interested, and the application may filter the push information set according to the personal information, to finally obtain the push information in which the user 1 is interested, that is, obtain the information involving military, and output the information involving military by using the user equipment. In this way, the user 1 can browse, by using the user equipment, only the information involving military that is suitable to the user 1 and in which the user 1 is interested, without browsing the information involving traveling in which the user 2 is interested.

A method for the application to determine push information according to a preference of a user, that is, a method for acquiring a push information set is not limited by this embodiment, is a technology well known by a person skilled in the art, and may be correspondingly set according to practice. Details are not described herein again. For example, a video application determines a preference of a user according to an operation habit of the user, for example, the user prefers to watch a traveling video, and then the video website may determine that video information involving traveling is push information of the user.

Generally, there are many users that have not registered an account. In order to push information that are suitable to these users and in which these users are interested to these users, the application may analyze operation habits of all users who have used the application, to obtain preferences of the users, and further obtain push information corresponding to the preferences. In this case, the push information set includes the push information involving the preferences of the users that have used the application or the user equipment.

Further optionally, if a current account that is logged in to is in a logged-in state, if the user 1 has used the application, and the application has determined, according to an operation habit of the user 1, push information involving a preference of the user 1, in this case, the application may further encapsulate the feature information of the user 1 and the push information involving the preference of the user 1; and when the user 1 subsequently uses the application again, the user equipment may acquire the push information involving the preference of the user 1 from historical encapsulated data according to the acquired feature information of the user 1.

In an implementation manner of this embodiment, the outputting, by the application, corresponding content for the current user according to the personal information may further include:

the application may further modify, according to the personal information, a user interface UI that is output when the application is run in the user equipment.

For example, if it is determined, according to the personal information, that the current user is a young person engaged in an IT profession, the application may set the UI that is output when the application is run to a relatively complex interface that has relatively many options; and if it is determined, according to the personal information, that the current user is an old person, the application may set the UI that is output when the application is run to a relatively simple interface that has relatively few options.

The outputting, by the application, corresponding content for the current user according to the personal information is not limited by this embodiment, and may be set according to an actual need. Details are not described herein again.

In this embodiment, a service platform receives feature information of a current user sent by an application, where the current user is a user that is currently using the application; processes the feature information by using a demography model, to obtain personal information of the current user; and sends the personal information to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

In addition, the application can acquire the personal information of the current user, that is, the application can identify the current user, and output corresponding content for the current user according to the personal information, for example, the application can acquire to-be-pushed information corresponding to the personal information from a push information set, where the personal information may be information that is suitable for the current user to browse and in which the current user is interested, that is, the application filters the push information set according to the personal information, and pushes information obtained after the filtration to the user equipment and outputs the information, where the information obtained after the filtration is the information that is suitable for the current user to browse and in which the current user is interested. In other words, the application can push information that is suitable for the current user to browse and in which the current user is interested to the user equipment and output the information, and push information that is not suitable for the current user or push information in which the current user is not interested is not pushed to the user equipment, that is, is not output. In this way, when multiple users use a same account to access the Internet or multiple nonregistered users use same user equipment to access the Internet, the users can browse, by using the user equipment, only push information that is suitable for the users and in which the users are interested, thereby improving user experience.

The following provides some virtual apparatus embodiments, where the virtual apparatus embodiments separately correspond to the corresponding method embodiments provided above.

Figure 3:
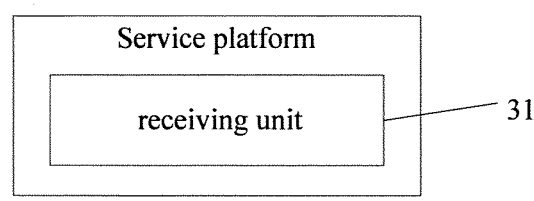
FIG. 3 is a schematic structural diagram of a service platform according to an embodiment.

An embodiment provides a service platform. As shown in FIG. 3, the service platform may include:

a receiving unit 31, configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information.

The current user is a user that is currently using the application.

If an application needs to output corresponding content according to personal information of a current user, the content output by the application needs to be suitable for the current user, that is, can better satisfy a requirement of the current user. Specifically, the application may first acquire feature information of the current user, and send the obtained feature information to the service platform; and the service platform may acquire personal information corresponding to the feature information.

The demography model may include, but is not limited to, processing code used to acquire the personal information corresponding to the feature information, or the like.

In an implementation manner of this embodiment, the service platform may acquire processing code corresponding to the received feature information from the demography model, and acquire, according to the acquired processing code, the personal information corresponding to the feature information, where the acquired personal information is the personal information of the current user.

The service platform may send the acquired personal information to the application; and then the application may output the corresponding content according to the received personal information, where the corresponding content may be the content that is suitable for the current user. In this way, the requirement of the current user can be better satisfied, and further user experience is improved.

In this embodiment, the service platform is configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

Figure 4:
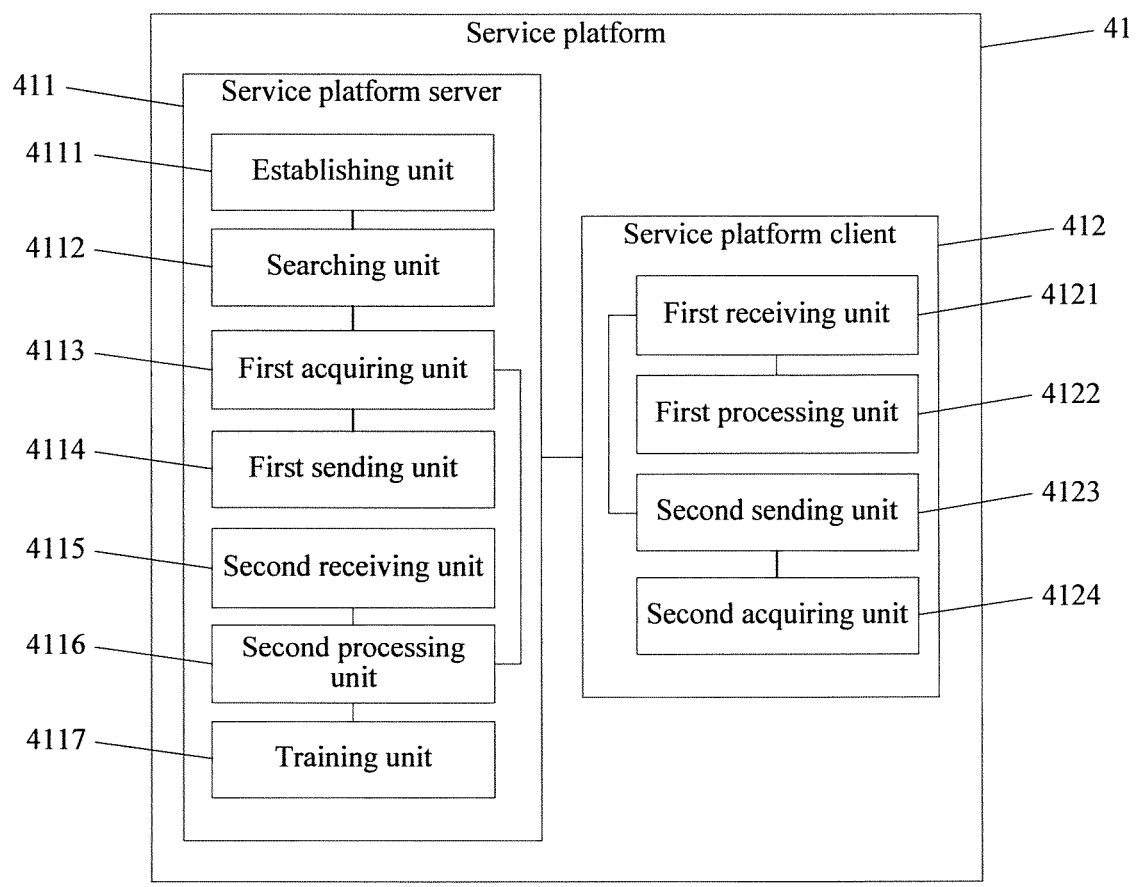
FIG. 4 is a schematic structural diagram of another service platform according to an embodiment.

An embodiment provides another service platform, where the service platform is further extension and optimization of the service platform shown in FIG. 3. As shown in FIG. 4, the service platform may include:

the service platform 41, configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information.

If an application needs to output corresponding content according to personal information of a current user, the content output by the application needs to be suitable for the current user, that is, can better satisfy a requirement of the current user. Specifically, the application may first acquire feature information of the current user, and send the obtained feature information to the service platform; and the service platform may acquire personal information corresponding to the feature information.

The demography model may include, but is not limited to, processing code used to acquire the personal information corresponding to the feature information, or the like.

In an implementation manner of this embodiment, the service platform may acquire processing code corresponding to the received feature information from the demography model, and acquire, according to the acquired processing code, the personal information corresponding to the feature information, where the acquired personal information is the personal information of the current user.

The service platform may send the acquired personal information to the application; and then the application may output the corresponding content according to the received personal information, where the corresponding content may be the content that is suitable for the current user. In this way, the requirement of the current user can be better satisfied, and further user experience is improved.

Further, the service platform 41 includes: a service platform server 411 and a service platform client 412, and the demography model is stored on the service platform server 411;

the service platform server 411 includes:

an establishing unit 4111, configured to: before the service platform 41 receives the feature information of the current user sent by the application, establish an application programming interface (API) corresponding to a submodel of the demography model, where the demography model includes the at least one submodel; and the service platform 41 is further configured to: before processing the feature information by using the demography model, receive an API call request sent by the application, where the API call request is used to indicate a to-be-called API.

When an application is run, the application may acquire personal information of a current user by invoking corresponding processing code in the demography model. Specifically, it may be that the application sends an API call request to the service platform, to call a corresponding API, and further acquire processing code corresponding to the called API.

The personal information may include, but is not limited to, at least one of the following information: gender information, age information, occupation information, and the like, which may be specifically determined by the called API.

If the to-be-called API is a gender model API, that is, the application calls the gender model API, it indicates that the application needs to acquire the gender information of the current user; if the to-be-called API is an age model API, that is, the application calls the age model API, it indicates that the application needs to acquire the age information of the current user; and if the to-be-called API is an occupation model API, that is, the application calls the occupation model API, it indicates that the application needs to acquire an occupation module of the current user.

The service platform server 411 further includes:

a searching unit 4112, configured to search the demography model for a submodel corresponding to the to-be-called API; and a first acquiring unit 4113, configured to acquire, on the service platform server, processing code from the submodel found by the searching unit 4112; and the service platform 41 is further configured to process the feature information according to the processing code acquired by the first acquiring unit, to obtain the personal information corresponding to the feature information.

Further, the establishing unit 4111 is specifically configured to establish at least one type of the following APIs: a gender model API corresponding to a gender model, an age model API corresponding to an age model, or an occupation model API corresponding to an occupation model, where the gender model may include processing code of a method for acquiring age information corresponding to the feature information; the age model may include processing code of a method for acquiring age information corresponding to the feature information; and the occupation model may include processing code of a method for acquiring occupation information corresponding to the feature information.

In other words, the demography model may include at least one of the following submodels: a gender model, an age model, and an occupation model, and each submodel corresponds to one API. When an application calls an API, it may be that the application calls processing code in a submodel corresponding to the API.

After completing establishing an API, the service platform server may open the established API to the service platform client, for example, may set, but is not limited to setting, the established API in an SDK of user equipment and open the established API to another application, so that the another application can call a required API.

The to-be-called API includes the at least one type of API in the established API.

Further, the service platform client 412 includes:

a first receiving unit 4121, configured to receive the feature information sent by the application;

the service platform server 411 further includes:

a first sending unit 4114, configured to send the processing code acquired by the first acquiring unit 4113 to the service platform client; and the service platform client 412 further includes:

a first processing unit 4122, configured to process the feature information according to the processing code sent by the first sending unit 4114, to obtain the personal information corresponding to the feature information.

Further, the service platform server 411 further includes:

a second receiving unit 4115, configured to receive the feature information sent by the application;

the service platform client 412 further includes:

a second sending unit 4123, configured to send the feature information received by the first receiving unit 4121 to the service platform server; and the service platform server 411 further includes:

a second processing unit 4116, configured to process the feature information according to the processing code acquired by the first acquiring unit 4121, to obtain the personal information corresponding to the feature information.

Further, the service platform client 412 further includes:

a second acquiring unit 4124, configured to acquire multiple types of different feature information of multiple users, where the second sending unit 4123 is further configured to send the multiple types of different feature information that are acquired by the second acquiring unit 4124 to the service platform server; and the service platform server 411 further includes:

a training unit 4117, configured to perform model training on the demography model according to the multiple types of different feature information that are acquired by the second acquiring unit 4124.

Further, the service platform 41 is specifically configured to receive at least one type of the following information sent by the application: audio information, image information, sensing parameter information, and application operation information.

In this embodiment, the service platform, configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

In addition, the application can acquire the personal information of the current user, that is, the application can identify the current user, and output corresponding content for the current user according to the personal information, for example, the application can acquire to-be-pushed information corresponding to the personal information from a push information set, where the personal information may be information that is suitable for the current user to browse and in which the current user is interested, that is, the application filters the push information set according to the personal information, and pushes information obtained after the filtration to the user equipment and outputs the information, where the information obtained after the filtration is the information that is suitable for the current user to browse and in which the current user is interested. In other words, the application can push information that is suitable for the current user to browse and in which the current user is interested to the user equipment and output the information, and push information that is not suitable for the current user or push information in which the current user is not interested is not pushed to the user equipment, that is, is not output. In this way, when multiple users use a same account to access the Internet or multiple nonregistered users use same user equipment to access the Internet, the users can receive, by using the user equipment, only push information that is suitable for the users and in which the users are interested, thereby improving user experience.

The following provides some physical apparatus embodiments in which the information processing method shown in FIG. 2 is run, where the physical apparatus embodiments may separately correspond to the corresponding method embodiments and service platform embodiments provided above.

Figure 5:
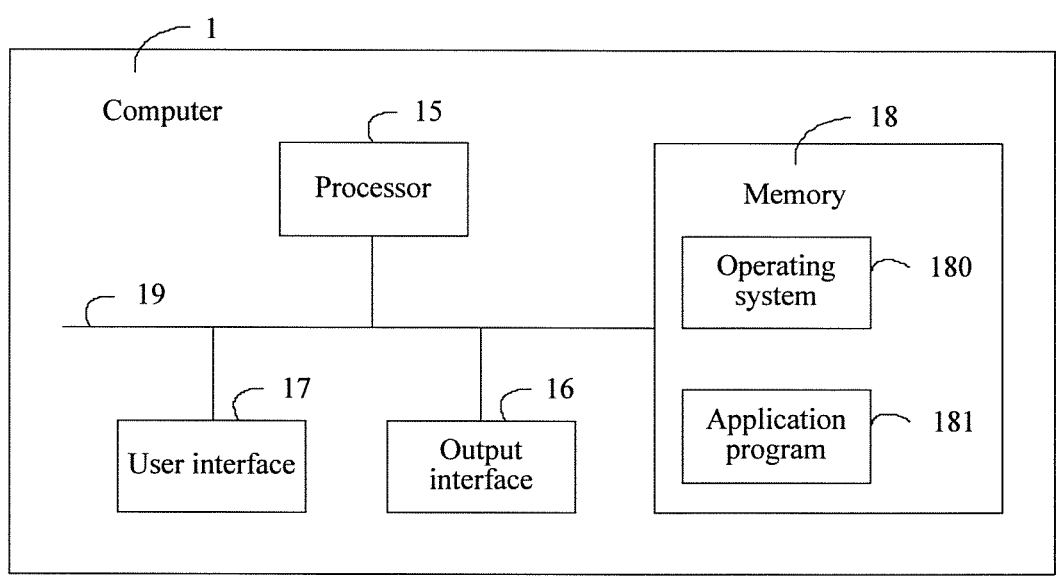
FIG. 5 is a schematic structural diagram of a computer that uses the information processing method shown in FIG. 2 according to an embodiment.

An embodiment further provides a computer 1. As shown in FIG. 5, the computer 1 includes: at least one processor 15, for example, a CPU (Central Processing Unit, central processing unit), at least one output interface 16 or another user interface 17, a memory 18, and at least one communications bus 19. The communications bus 19 is configured to implement a connection and communication between the foregoing components. Optionally, the computer 1 includes another user interface 17, including a display, a keyboard, or a clicking device (for example, a mouse, a trackball (trackball), a touch panel or a touch display screen). The memory 18 may include a high-speed RAM (Random Access Memory, random access memory), and may also include a non-volatile memory (non-volatile memory), for example, at least one magnetic disk storage. Optionally, the memory 18 may include at least one storage apparatus that is located far away from the foregoing processor 15.

In some implementation manners, the following elements, executable modules or data structures, or a subset thereof, or an extension set thereof are stored in the memory 18:

an operating system 180, including various system programs, and configured to implement various basic services and process hardware-based tasks; and an application program 181, including various application programs, and configured to implement various application services.

Specifically, the application program 181 may include, but is not limited to, the application program 181, configured to receive feature information of a current user sent by an application, where the current user is a user that is currently using the application, process, by using a demography model, the feature information received by the receiving unit, to obtain personal information of the current user, and send the personal information obtained by a processing unit to the application, so that the application outputs corresponding content for the current user according to the personal information.

Further, the application program 181 includes: an application program server and an application program client, and the demography model is stored in the application program server;

the application program 181 may include:

an establishing unit, configured to: before the application program 181 receives the feature information of the current user sent by the application, establish an application programming interface (API) corresponding to a submodel of the demography model, where the demography model includes the at least one submodel;

the application program 181 is further configured to: before processing the feature information by using the demography model, receive an API call request sent by the application, where the API call request is used to indicate a to-be-called API; and the application program server further includes:

a searching unit, configured to search the demography model for a submodel corresponding to the to-be-called API; and a first acquiring unit, configured to acquire, in the application program server, processing code from the submodel found by the searching unit; and the application program 181 is further configured to process the feature information according to the processing code acquired by the first acquiring unit, to obtain the personal information corresponding to the feature information.

Further, the establishing unit is specifically configured to establish at least one type of the following APIs: a gender model API corresponding to a gender model, an age model API corresponding to an age model, or an occupation model API corresponding to an occupation model, where the to-be-called API includes the at least one type of API in the established API.

Further, the application program client includes:

a first receiving unit, configured to receive the feature information sent by the application;

the application program server further includes:

a first sending unit, configured to send the processing code acquired by the first acquiring unit, to the service platform client; and the application program client further includes:

a first processing unit, configured to process the feature information according to the processing code sent by the first sending unit, to obtain the personal information corresponding to the feature information.

Further, the application program server further includes:

a second receiving unit, configured to receive the feature information sent by the application;

the application program client further includes:

a second sending unit, configured to send the feature information received by the first receiving unit to the application program server; and the application program server further includes:

a second processing unit, configured to process the feature information according to the processing code received by the first receiving unit, to obtain the personal information corresponding to the feature information.

Further, the application program client further includes:

a second acquiring unit, configured to acquire multiple types of different feature information of multiple users, where the second sending unit is further configured to send the multiple types of different feature information that are acquired by the second acquiring unit to the service platform server.

The application program server further includes:

a training unit, configured to perform model training on the demography model according to the multiple types of different feature information that are acquired by the second acquiring unit.

Further, the application program 181 is specifically configured to receive at least one type of the following information sent by the application: audio information, image information, sensing parameter information, and application operation information.

In this embodiment of the present invention, the computer 1 may invoke a program or an instruction stored in the memory 18, and the processor 15 is configured to:

receive feature information of a current user sent by an application, where the current user is a user that is currently using the application;

process the feature information by using a demography model, to obtain personal information of the current user; and send the personal information to the application, so that the application outputs corresponding content for the current user according to the personal information.

Further, the service platform includes: a service platform server and a service platform client, and the demography model is stored on the service platform server;

the processor 15 is further configured to: before the service platform receives the feature information of the current user sent by the application, establish, on the service platform server, an application programming interface (API) corresponding to a submodel of the demography model, where the demography model includes the at least one submodel;

the processor 15 is specifically configured to receive an API call request sent by the application, where the API call request is used to indicate a to-be-called API; and the processor 15 is specifically configured to search, on the service platform server, the demography model for a submodel corresponding to the to-be-called API;

acquire, on the service platform server, processing code from the found submodel; and process the feature information according to the processing code, to obtain the personal information corresponding to the feature information.

Further, the processor 15 is specifically configured to establish at least one type of the following APIs: a gender model API corresponding to a gender model, an age model API corresponding to an age model, or an occupation model API corresponding to an occupation model, where the to-be-called API includes the at least one type of API in the established API.

Further, the processor 15 is specifically configured to receive, on the service platform client, the feature information sent by the application; and send, on the service platform server, the processing code to the service platform client; and process, on the service platform client, the feature information according to the processing code, to obtain the personal information corresponding to the feature information.

Further, the processor 15 is specifically configured to receive, on the service platform server, the feature information sent by the application; or, receive, on the service platform client, the feature information sent by the application, and send the feature information to the service platform server; and process, on the service platform server, the feature information according to the processing code, to obtain the personal information corresponding to the feature information.

Further, the processor 15 is further configured to acquire, on the service platform client, multiple types of different feature information of multiple users, and sending the multiple types of different feature information to the service platform server; and perform, on the service platform server, model training on the demography model according to the multiple types of different feature information.

Further, the processor 15 is specifically configured to receive at least one type of the following information sent by the application: audio information, image information, sensing parameter information, and application operation information.

In this embodiment, a service platform receives feature information of a current user sent by an application, where the current user is a user that is currently using the application; processes the feature information by using a demography model, to obtain personal information of the current user; and sends the personal information to the application, so that the application outputs corresponding content for the current user according to the personal information. By means of the foregoing solutions, a service platform can acquire personal information, which corresponds to feature information of a current user, of the current user according to a demography model, and send the personal information to an application. The personal information is the personal information of the current user; therefore, the application can output, according to the personal information, content that is suitable for the current user and in which the current user is interested. In this way, not only a requirement of the current user can be better satisfied, but also a better service can be provided to the current user, thereby avoiding a problem that the content output by the application is not suitable for the current user, and further improving user experience.

In addition, the application can acquire the personal information of the current user, that is, the application can identify the current user, and output corresponding content for the current user according to the personal information, for example, the application can acquire to-be-pushed information corresponding to the personal information from a push information set, where the personal information may be information that is suitable for the current user to browse and in which the current user is interested, that is, the application filters the push information set according to the personal information, and pushes information obtained after the filtration to the user equipment and outputs the information, where the information obtained after the filtration is the information that is suitable for the current user to browse and in which the current user is interested. In other words, the application can push information that is suitable for the current user to browse and in which the current user is interested to the user equipment and output the information, and push information that is not suitable for the current user or push information in which the current user is not interested is not pushed to the user equipment, that is, is not output. In this way, when multiple users use a same account to access the Internet or multiple nonregistered users use same user equipment to access the Internet, the users can receive, by using the user equipment, only push information that is suitable for the users and in which the users are interested, thereby improving user experience.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The computer software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information processing method performed on a service platform, the method, comprising:

storing, on a service platform server, a demography model, wherein the demography model comprises multiple submodels corresponding to multiple application programming interfaces (APIs);

establishing on the service platform server, the multiple APIs corresponding to the multiple submodels of the demography model, wherein the service platform server opens the established API to at least one application available to a current user;

receiving, by at least one processing device of the service platform, feature information of the current user sent by an application, wherein:

the feature information includes at least one type of audio, image, sensing parameter and application operation information; and the current user is a user that is currently using the application;

receiving an API call request sent by the application, wherein the API call request is used to indicate a to-be-called API;

processing, by the at least one processing device, the feature information using the demography model, to obtain personal information of the current user; and sending, by the at least one processing device, the personal information to the application, the personal information enabling the application to output corresponding content for the current user according to the personal information, wherein processing the feature information using the demography model, to obtain the personal information of the current user comprises:

searching, on the service platform server, the demography model to find a submodel corresponding to the to-be-called application programming interface (API), wherein the submodel includes a processing code for acquiring the corresponding personal information;

acquiring, on the service platform server in response to finding the submodel, the processing code from the found submodel; and processing the feature information according to the processing code, to obtain the personal information corresponding to the feature information.

2. The information processing method according to claim 1, wherein establishing the multiple APIs corresponding to the multiple submodels of the demography model comprises:

establishing at least two of the following APIs: a gender model API corresponding to a gender model, an age model API corresponding to an age model, or an occupation model API corresponding to an occupation model.

3. The information processing method according to claim 1, wherein receiving, by the at least one processing device, feature information of a current user sent by the application comprises:

receiving, by a service platform client, the feature information sent by the application; and processing the feature information according to the processing code, to obtain the personal information corresponding to the feature information comprises:

sending, by the service platform server, the processing code to the service platform client, and processing, by the service platform client, the feature information according to the processing code, to obtain the personal information corresponding to the feature information.

4. The information processing method according to claim 1, wherein:

receiving, by the at least one processing device, feature information of a current user sent by the application comprises:

receiving, by the service platform server, the feature information sent by the application, or receiving, by a service platform client, the feature information sent by the application, and sending the feature information to the service platform server; and processing the feature information according to the processing code, to obtain the personal information corresponding to the feature information comprises:

processing, by the service platform server, the feature information according to the processing code, to obtain the personal information corresponding to the feature information.

5. The information processing method according to claim 1, wherein the method further comprises:

acquiring, by a service platform client, multiple types of different feature information of multiple users, and sending the multiple types of different feature information to the service platform server; and performing, by the service platform server, model training on the demography model according to the multiple types of different feature information.

6. A platform, comprising:

a service platform comprising at least one processing device and a service platform server, the service platform server configured to:

store a demography model, wherein the demography model comprises multiple submodels corresponding to multiple application programming interfaces (APIs); and establish the multiple APIs corresponding to the multiple submodels of the demography model, wherein the service platform server opens the established API to at least one application available to a current user;

the at least one processing device configured to:

receive feature information of the current user sent by an application, wherein:

the feature information includes at least one type of audio, image, sensing parameter and application operation information; and the current user is a user that is currently using the application;

receive an API call request sent by the application, wherein the API call request is used to indicate a to-be-called API;

process, using the demography model, the feature information, to obtain personal information of the current user; and send the personal information to the application, the personal information enabling the application to output corresponding content for the current user according to the personal information, wherein to process the feature information using the demography model, to obtain the personal information of the current user, the at least one processing device is further configured to:

search, on the service platform server, the demography model to find a submodel corresponding to the to-be-called application programming interface (API), wherein the submodel includes a processing code for acquiring the corresponding personal information;

acquire, on the service platform server in response to finding the submodel, the processing code from the found submodel; and process the feature information according to the processing code, to obtain the personal information corresponding to the feature information.

7. The platform according to claim 6, wherein:

the service platform further comprises: a service platform client.

8. The platform according to claim 7, wherein the at least one processing device is further configured to establish at least two of the following APIs: a gender model API corresponding to a gender model, an age model API corresponding to an age model, or an occupation model API corresponding to an occupation model.

9. The platform according to claim 8, wherein the at least one processing device is further configured to:
- receive, by the service platform server, the feature information sent by the application;
- receive, by the service platform client, the feature information sent by the application, and send the feature information to the service platform server; and
- process, by the service platform server, the feature information according to the processing code, to obtain the personal information corresponding to the feature information.

10. The platform according to claim 7, wherein the at least one processing device is further configured to:
- receive, by the service platform client, the feature information sent by the application;
- send, by the service platform server, the processing code to the service platform client; and
- process, by the service platform client, the feature information according to the processing code, to obtain the personal information corresponding to the feature information.

11. The platform according to claim 7, wherein the at least one processing device is further configured to:
- acquire, by the service platform client, multiple types of different feature information of multiple users, and send the multiple types of different feature information to the service platform server; and
- perform, by the service platform server, model training on the demography model according to the multiple types of different feature information.

* * * * *